US011699009B2

(12) United States Patent
Huang (10) Patent No.: US 11,699,009 B2
(45) Date of Patent: Jul. 11, 2023

(54) INTEGRATED CIRCUIT DESIGN METHOD AND SYSTEM (71) Applicant: TAIWAN SEMICONDUCTOR MANUFACTURING COMPANY, LTD., Hsinchu (TW)

(72) Inventor: Tien-Chien Huang, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 20 days.

(21) Appl. No.: 17/205,749

(22) Filed: Mar. 18, 2021

(65) Prior Publication Data
US 2021/0224443 A1 Jul. 22, 2021

Related U.S. Application Data (62) Division of application No. 16/459,116, filed on Jul. 1, 2019, now Pat. No. 10,970,438.

(60) Provisional application No. 62/712,612, filed on Jul. 31, 2018.

(51) Int. Cl.
G06F 30/30 (2020.01)
G06F 30/20 (2020.01)
G06F 111/12 (2020.01)

(52) U.S. Cl.
CPC ............ G06F 30/30 (2020.01); G06F 30/20 (2020.01); G06F 2111/12 (2020.01)

(58) Field of Classification Search
CPC ...... G06F 30/30; G06F 30/20; G06F 2111/12; G06F 30/367; G06F 30/392; G06F 2111/04
USPC ........................................................ 716/100
See application file for complete search history.

(56) References Cited

U.S. PATENT DOCUMENTS

| 7,260,442 | B2 | 8/2007 | Hwang et al. |
| 9,256,709 | B2 | 2/2016 | Yu et al. |
| 2008/0281570 | A1* | 11/2008 | Joshi ...................... G06F 30/367 703/14 |
| 2009/0141909 | A1* | 6/2009 | van Katz ................. H04R 3/00 381/113 |
| 2013/0117001 | A1 | 5/2013 | Goo et al. |
| 2014/0040838 | A1 | 2/2014 | Liu et al. |
| 2015/0188536 | A1* | 7/2015 | Tang .................... H03K 17/687 327/390 |
| 2015/0278429 | A1 | 10/2015 | Chang |
| 2016/0110489 | A1 | 4/2016 | Schroeder et al. |
| 2018/0294344 | A1* | 10/2018 | Gong ................ H01L 21/02675 |

* cited by examiner

Primary Examiner — Paul Dinh
(74) Attorney, Agent, or Firm — Hauptman Ham, LLP (57) ABSTRACT A method of generating a layout diagram of an IC device includes assigning a leakage constraint to a first schematic net of the IC device and determining a violation of the leakage constraint based on a dummy gate region. The IC layout diagram includes the dummy gate region between a first component of the first schematic net and a second component of a second schematic net of the IC device. The method includes modifying the IC layout diagram in response to the leakage constraint violation, and generating a layout file based on the modified IC layout diagrams.

20 Claims, 7 Drawing Sheets

INTEGRATED CIRCUIT DESIGN METHOD AND SYSTEM

PRIORITY CLAIM

The present application is a divisional of U.S. application Ser. No. 16/459,116, filed Jul. 1, 2019, which claims the priority of U.S. Provisional Application No. 62/712,612, filed Jul. 31, 2018, which are incorporated herein by reference in their entireties.

BACKGROUND

The ongoing trend in miniaturizing integrated circuits (ICs) has resulted in progressively smaller devices which consume less power, yet provide more functionality at higher speeds than earlier technologies. Miniaturization has been achieved through design and manufacturing innovations tied to increasingly strict specifications. Various electronic design automation (EDA) tools are used to generate, revise, and verify designs for semiconductor devices while ensuring that design and manufacturing specifications are met.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In various embodiments, a layout diagram based on a netlist of an IC device includes a dummy gate region that intersects an active region and is associated with a leakage current between adjacent circuit components. Prior to generating the layout diagram, at least one schematic net of the netlist is identified as being leakage sensitive, and the dummy gate region is flagged for a leakage violation if the layout includes a component of the leakage-sensitive schematic net adjacent to the dummy gate region. A layout diagram change to address the leakage violation can then be made prior to performing a post-layout simulation, thereby avoiding one or more debugging steps used to address a leakage problem discovered by performing the post-layout simulation.

In some embodiments, a method includes performing an automated leakage test on a netlist, thereby efficiently identifying one or more leakage sensitive schematic nets. In some embodiments, a method includes executing a capacitance-only, post-layout netlist extraction, then obtaining simulation results with and without including a dummy gate region in the extracted netlist, thereby efficiently verifying that circuit performance is not compromised by the dummy gate region in the IC layout diagram.

Figure 1:
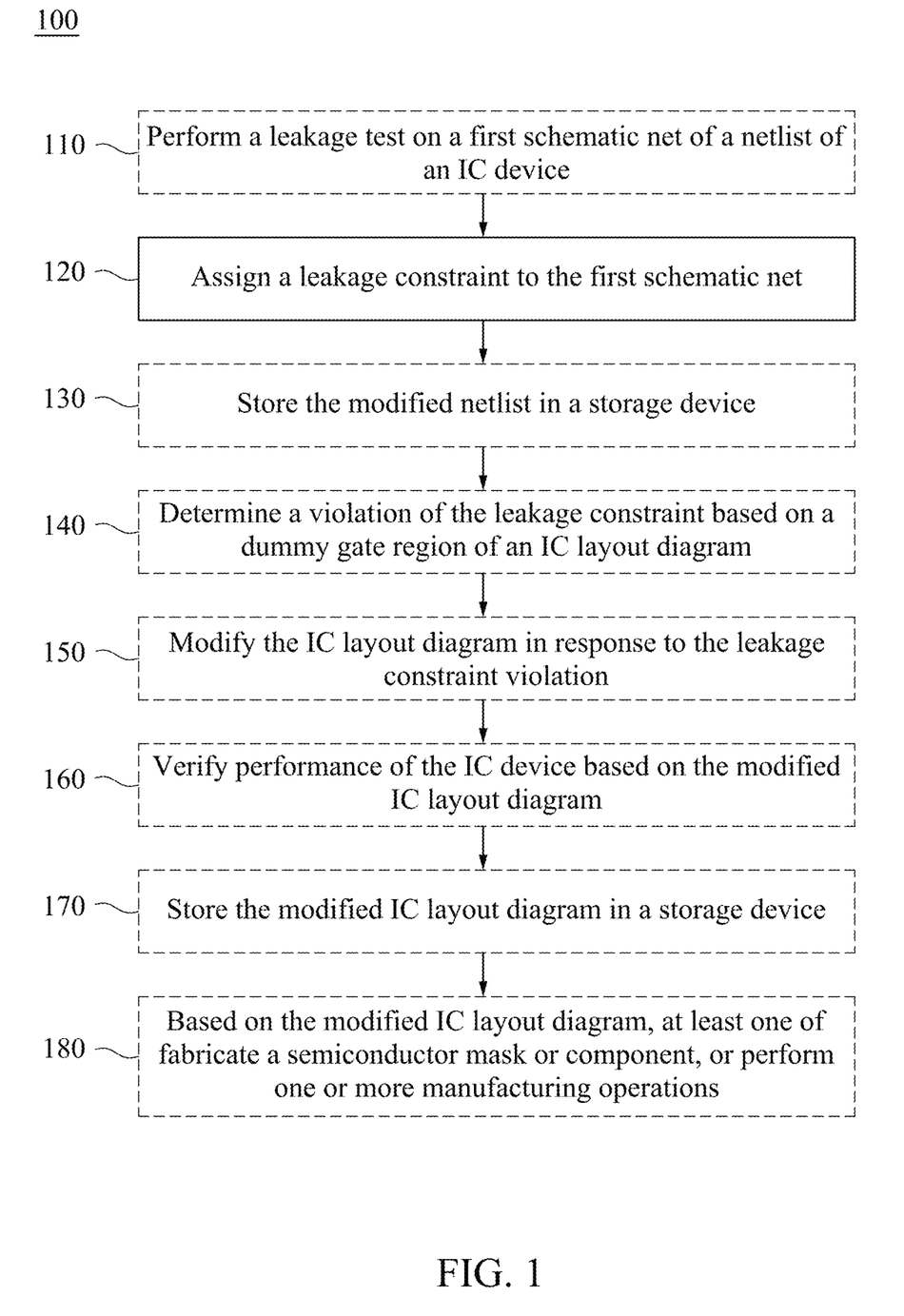
FIG. 1 is a flowchart of a method of generating a layout diagram of an IC device, in accordance with some embodiments.
Figure 2:
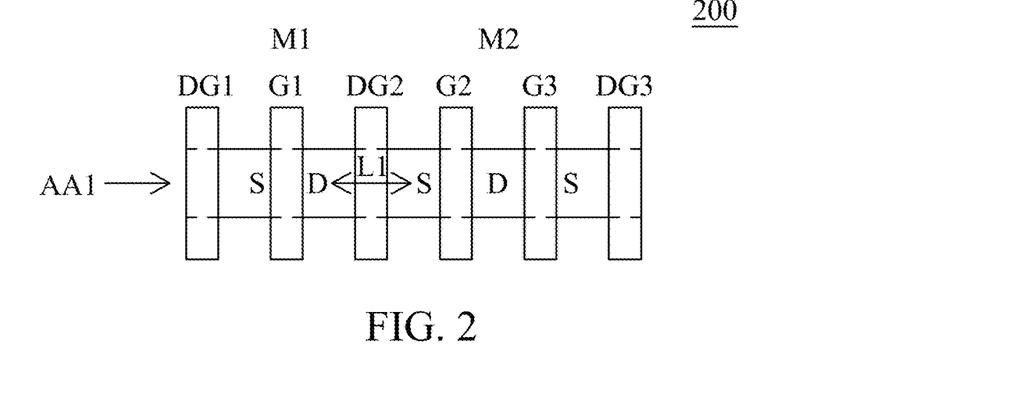
FIG. 2 depicts an IC layout diagram, in accordance with some embodiments.
Figure 4A:
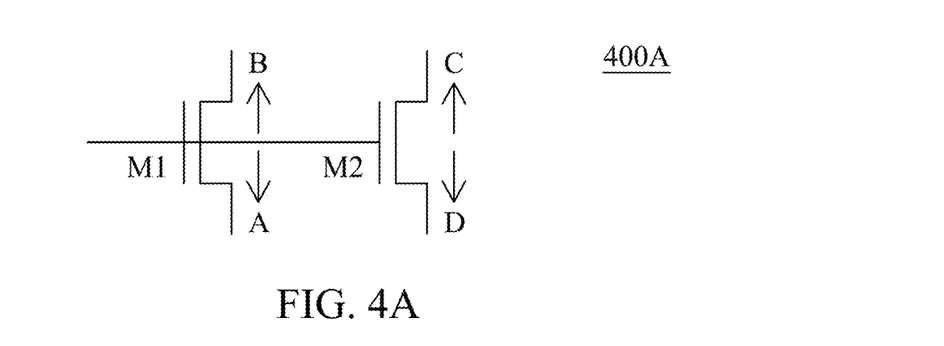
FIGS. 4A and 4B are diagrams of an IC device, in accordance with some embodiments.
Figure 4B:
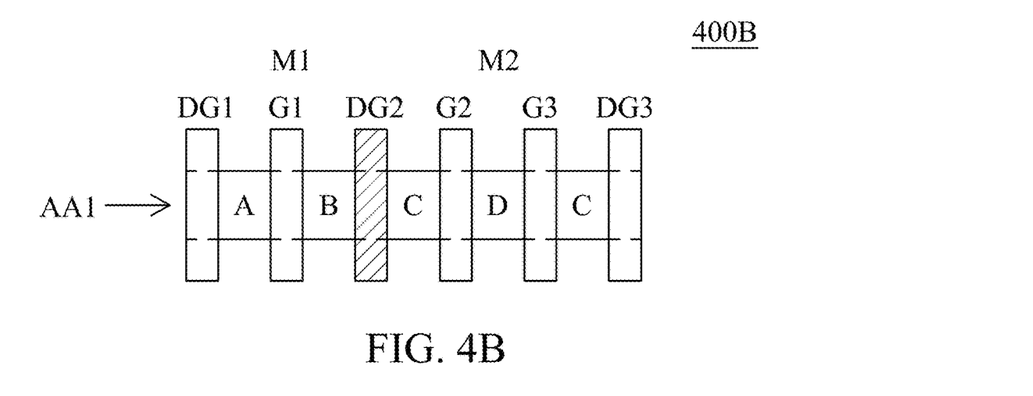
Figure 5A:
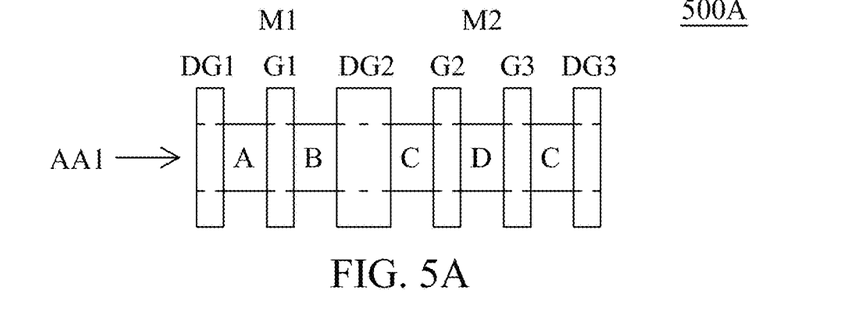
FIGS. 5A-5D depict IC layout diagrams, in accordance with some embodiments.
Figure 5B:
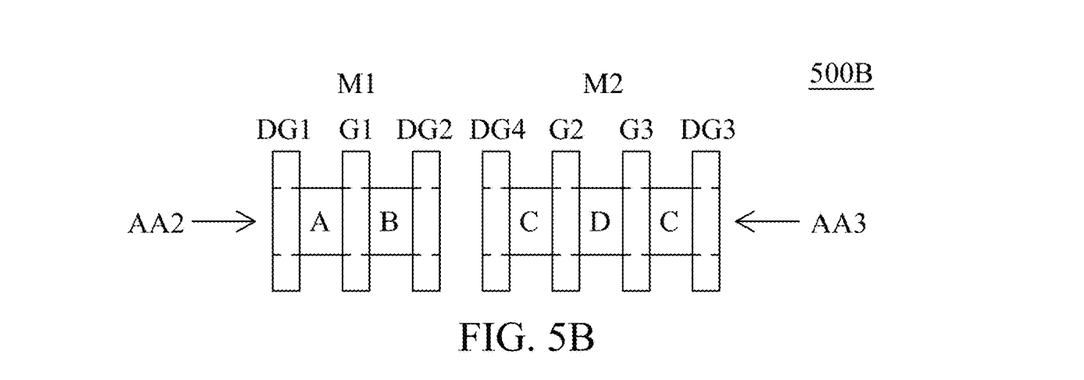
Figure 5C:
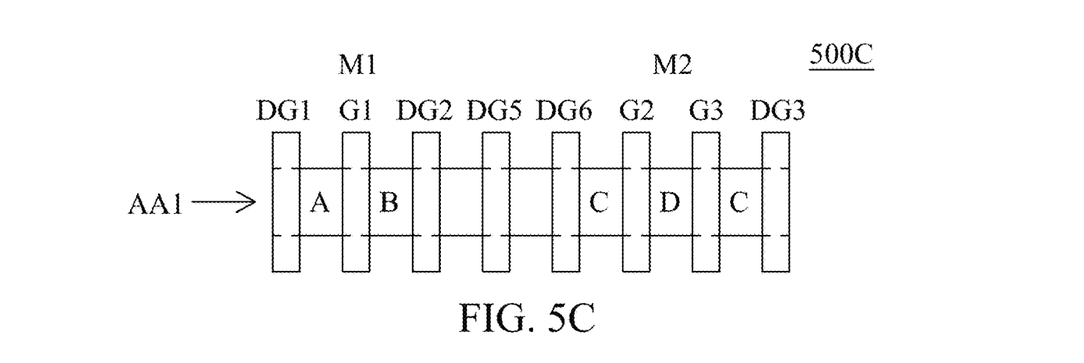
Figure 5D:
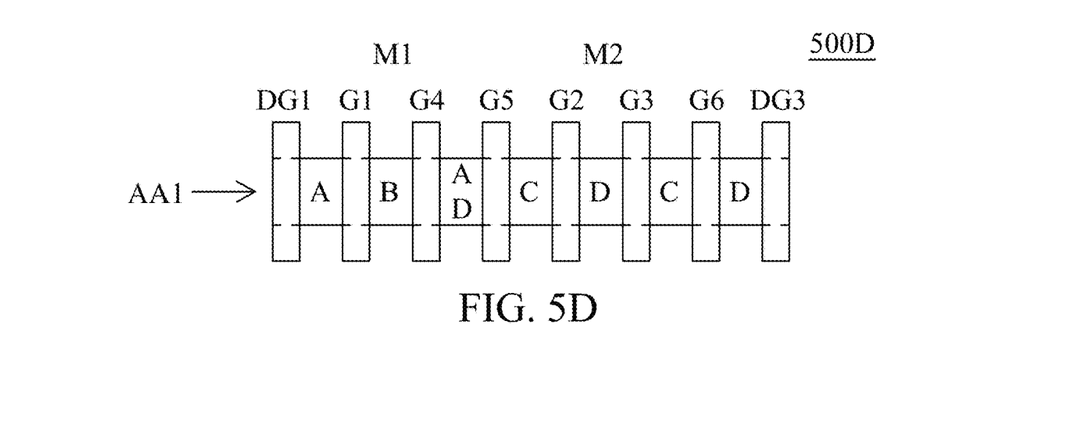
Figure 6:
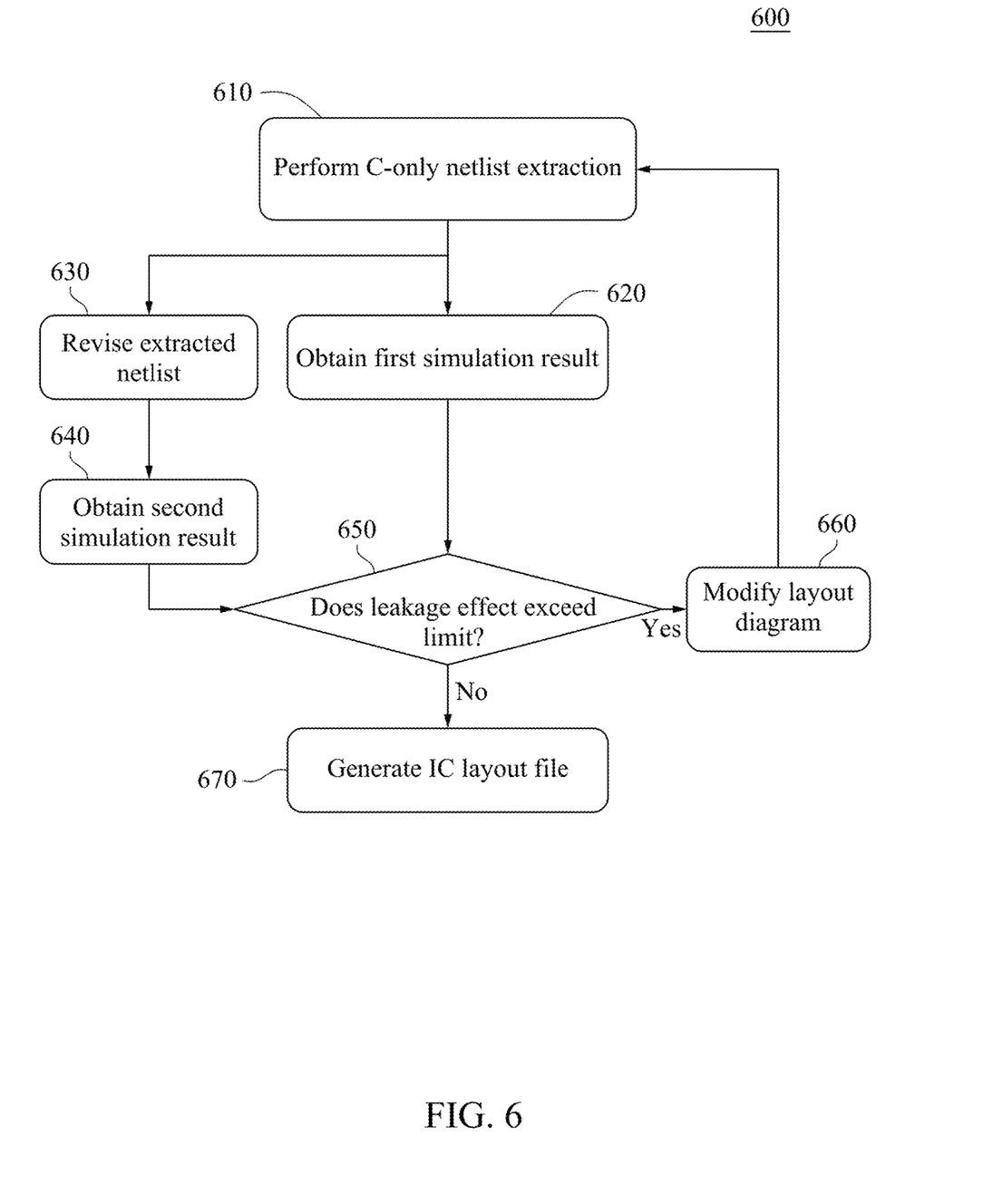
FIG. 6 is a flowchart of a method of generating a layout diagram of an IC device, in accordance with some embodiments.

Embodiments of the IC layout diagram generation operations are provided in a method 100, depicted in FIG. 1 and illustrated using FIGS. 2-5D, and in a method 600, depicted in FIG. 6. FIG. 2 illustrates an example of a dummy gate region corresponding to a leakage path; FIGS. 3A-3D provide a schematic representation of performing a leakage test on a netlist, FIGS. 4A and 4B illustrate an example of flagging a leakage violation, and FIGS. 5A-5D illustrate examples of modifying an IC layout diagram to address a leakage violation.

FIG. 1 is a flowchart of method 100 of generating a layout diagram of an IC device, in accordance with some embodiments. In some embodiments, generating the layout diagram of the IC device includes generating a netlist of the IC device. In some embodiments, generating the layout diagram of the IC device includes generating an IC layout diagram corresponding to a plurality of transistors, e.g., planar transistors and/or fin field-effect transistors (FinFETs). Non-limiting examples of IC devices including a plurality of transistors include memory circuits, logic devices, processing devices, signal processing circuits, or the like.

In some embodiments, some or all of method 100 is executed by a processor of a computer. In some embodiments, executing some or all of method 100 is part of executing an automated place-and-route (APR) operation using a processor of a computer. In some embodiments, some or all of method 100 is executed by a processor 702 of an IC device design system 700, discussed below with respect to FIG. 7.

Some or all of the operations of method 100 are capable of being performed as part of a design procedure performed in a design house, e.g., a design house 820 discussed below with respect to FIG. 8.

In some embodiments, the operations of method 100 are performed in the order depicted in FIG. 1. In some embodiments, the operations of method 100 are performed in an order other than the order depicted in FIG. 1. In some embodiments, one or more operations are performed before, between, during, and/or after performing one or more operations of method 100.

At operation 110, in some embodiments, a leakage test is performed on a first schematic net of the netlist of the IC device. Performing the leakage test includes adding a circuit element to the schematic net and determining if the presence of the added circuit element affects a circuit parameter. In some embodiments, performing the leakage test includes performing the leakage test on a SPICE format netlist.

Adding the circuit element includes adding a circuit element configured to emulate a leakage path corresponding to a dummy gate region. Dummy gate regions are non-functional gate regions included in an IC layout diagram to address one or more manufacturing objectives, e.g., feature spacing or equipment loading effects, and are used in a manufacturing process to define a gate structure. In some embodiments, a dummy gate region is a dummy poly gate region used in a manufacturing process to define a gate structure including a polysilicon layer. In some embodiments, a dummy gate region is included in a FinFET manufacturing process.

A dummy gate region intersects one or more active regions. In some cases, a dummy gate region intersects an edge of an active region and does not correspond to a leakage path in the active region. In some cases, a dummy gate region intersects an active region at an interior location such that a circuit component, e.g., a transistor, is located in the active region adjacent to the dummy gate region on each of two sides of the dummy gate region. In such cases, the dummy gate region corresponds to a leakage path between the two adjacent circuit components.

In some cases, a dummy gate region intersects an active region corresponding to p-type transistors, and the IC layout diagram includes conductive regions configured to electrically connect the resultant gate structure to a power supply voltage source, thereby depleting carriers in the underlying active area manufactured based on the active region. In other cases, a dummy gate region intersects an active region corresponding to n-type transistors, and the IC layout diagram includes conductive regions configured to electrically connect the resultant gate structure to a reference voltage source or ground, thereby depleting carriers in the underlying active area manufactured based on the active region.

Although depleted, sufficient carriers are present in both cases such that the dummy gate region corresponds to a leakage path, and the resultant leakage current is capable of affecting the performance of circuits that include a component adjacent to the dummy gate region.

FIG. 2 depicts a non-limiting example of an IC layout diagram 200, in accordance with some embodiments. IC layout diagram 200 includes an active region AA1 intersected by gate regions G1-G3 and dummy gate regions DG1-DG3. Gate region G1 corresponds to a transistor M1, and gate regions G2 and G3 correspond to a transistor M2. In various embodiments, transistors M1 and M2 are p-type or n-type transistors.

Transistor M1 includes a source region S between dummy gate region DG1 and gate region G1, and a drain region D between gate region G1 and dummy gate region DG2. Transistor M2 includes a source region S between dummy gate region DG2 and gate region G2, a drain region D between gate regions G2 and G3, and a source region S between gate region G3 and dummy gate region DG3.

Because dummy gate regions DG1 and DG3 intersect active region AA1 at edges of active region AA1, dummy gate regions DG1 and DG3 do not correspond to leakage paths. Because dummy gate DG2 intersects active region AA1 at an interior location between transistors M1 and M2, a leakage path L1 between the drain region D of transistor M1 and the source region S of transistor M2 between dummy gate region DG2 and gate region G2 corresponds to dummy gate region DG2.

The degree to which circuit performance is potentially affected by a dummy gate region, e.g., dummy gate region DG2, depends both on the criticality of leakage current with respect to the specified circuit function, and on the magnitude of the leakage current. Leakage current magnitude is a function of various factors, e.g., manufacturing recipe, device type, temperature, power supply voltage, the length of the leakage path as determined by a gate length corresponding to the width of the dummy gate region, or the like.

Depending on the conditions under which a leakage current is expected to be present, in various embodiments, various types of circuit elements are used to emulate the presence of a leakage path, e.g., leakage path L1, as part of performing the leakage test. Non-limiting examples of circuit element types include current sources, resistors, and p-type or n-type transistors configured to emulate leakage current based on dummy gate regions.

In various embodiments, adding the circuit element to the schematic net includes adding the circuit element at one or both of a drain terminal or a source terminal of one or more transistors in the schematic net. In various embodiments, adding the circuit element to the schematic net includes adding a first terminal of the circuit element at a location in the schematic net and adding one or more additional terminals of the circuit element at one or more additional locations in the schematic net, at one or more locations in a separate schematic net of the netlist, and/or at one or both of a power supply or reference node of the netlist.

In various embodiments, adding the circuit element to the schematic net includes sequentially adding the circuit element at some or all of the transistors in a given schematic net. In various embodiments, the schematic net is one schematic net of a plurality of schematic nets in the netlist, and adding the circuit element includes adding the circuit element to some or all of the schematic nets of the plurality of schematic nets.

In various embodiments, adding the circuit element to the schematic net includes adding a same type of circuit element at each location in the netlist, or adding different types of circuit elements at different locations in the netlist.

Figure 3A:
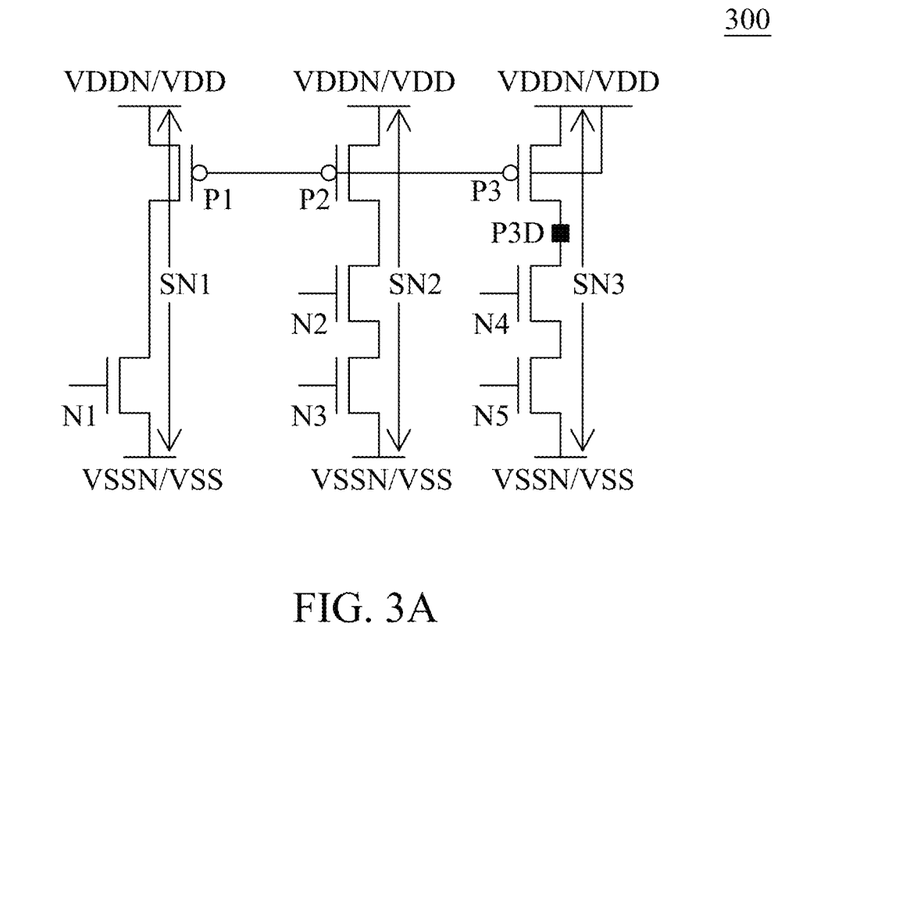
FIGS. 3A-3D are schematic diagrams of a netlist of an IC device, in accordance with some embodiments.
Figure 3B:
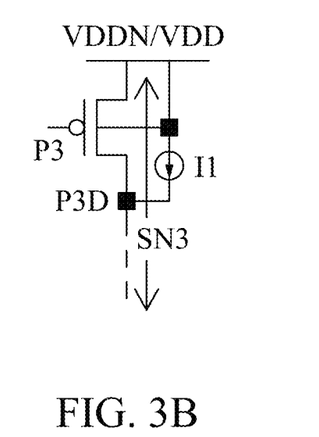
Figure 3C:
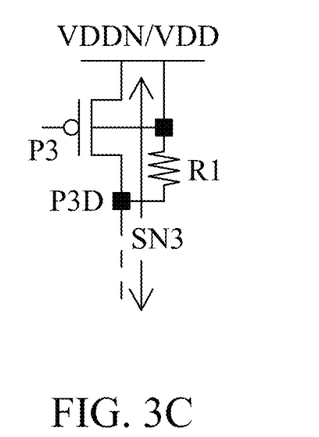
Figure 3D:
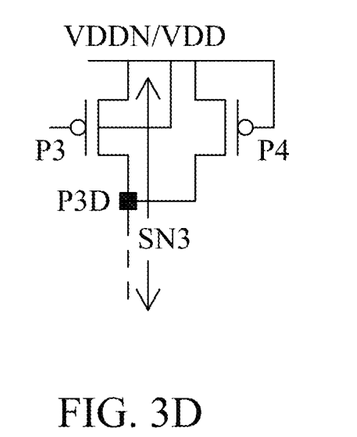

FIGS. 3A-3D are schematic diagrams of a non-limiting example of a netlist 300 of an IC device, in accordance with some embodiments. FIG. 3A depicts schematic nets SN1-SN3 prior to the addition of a circuit element, and FIGS. 3B-3D depict various embodiments of a portion of schematic net SN3 including an added circuit element.

As depicted in FIG. 3A, schematic net SN1 includes a p-type transistor P1 coupled in series with an n-type transistor N1 between a power supply node VDDN having a power supply voltage VDD and a reference node VSSN having a reference voltage VSS. Schematic net SN2 includes a p-type transistor P2 coupled in series with n-type transistors N2 and N3 between power supply node VDDN and reference node VS SN, and schematic net SN3 includes a p-type transistor P3 coupled in series with n-type transistors N4 and N5 between power supply node VDDN and reference node VSSN. P-type transistor P3 includes a drain terminal P3D connected to a drain terminal of transistor N4.

In the embodiment depicted in FIG. 3B, an output terminal of a current source I1 is added to schematic net SN3 at drain terminal P3D, and an input terminal of current source I1 is added at power supply node VDDN. In the embodiment depicted in FIG. 3C, a first terminal of a resistor R1 is added to schematic net SN3 at drain terminal P3D, and a second terminal of resistor R1 is added at power supply node VDDN. In the embodiment depicted in FIG. 3D, a drain terminal of a p-type transistor P4 is added to schematic net SN3 at drain terminal P3D, and a source terminal and gate of transistor P4 are added at power supply node VDDN.

In the non-limiting example depicted in FIGS. 3A-3D, performing the leakage test includes obtaining a first value of a circuit parameter based on the configuration depicted in FIG. 3A, obtaining a second value of the circuit parameter based on one of the configurations depicted in FIGS. 3B-3D, and comparing a difference between the two values to a predetermined limit. Determining that the circuit performance parameter is affected includes concluding that the difference exceeds the predetermined limit, and determining that the circuit performance parameter is not affected includes concluding that the difference is equal to or less than the predetermined limit.

In the embodiment depicted in FIGS. 3A-3D, transistors P1-P3 are configured to have an equivalent source-drain voltage drop, and a non-limiting example of a circuit performance parameter is an error between the source-drain voltage drops of transistors P1 and P3. In this example, the circuit performance parameter is determined to be affected when the error exceeds a predetermined error limit, and determined to be not affected when the error does not exceed the predetermined error limit.

In various embodiments, a circuit performance parameter includes a voltage or voltage difference, a current or current difference, a power level, a gain, a phase shift, a jitter level, an error or error rate, or any parameter suitable for assessing a circuit performance level.

In various embodiments, the predetermined limit is based on a specification of some or all of the IC device corresponding to the netlist, or a device or circuit that includes the IC device. In various embodiments, the circuit performance parameter and/or predetermined limit are specified by a user or determined automatically based on one or more specifications corresponding to the netlist.

In the embodiment depicted in FIGS. 3A-3D, performing the leakage test includes choosing one of current source I1, resistor R1, or transistor P4 as the circuit element to add to schematic net SN3.

In various embodiments, choosing the circuit element includes choosing a circuit element suitable for emulating a dummy gate region in the IC manufacturing process expected to be used to manufacture the IC device represented by the netlist. For example, choosing a resistor would be suitable for a dummy gate region in a first process in which a corresponding current path is resistive in nature, and choosing a transistor would be suitable for a dummy gate region in a second process in which a corresponding current path achieves a current saturation level.

In various embodiments, choosing the circuit element includes choosing one or more characteristics of the circuit element, e.g., a current level of a current source, a resistance value of a resistor, or transfer characteristics of a transistor. In various embodiments, choosing the one or more characteristics of the circuit element includes choosing the one or more characteristics suitable for emulating the dummy gate region in the expected IC manufacturing process.

In various embodiments, the circuit element and/or one or more characteristics are specified by a user or determined automatically based on one or more design rules and/or manufacturing recipe specifications corresponding to the IC manufacturing process.

In some embodiments, the leakage test is performed in accordance with a set of instructions, e.g., an application program, executed by processor 702 of IC device design system 700, discussed below with respect to FIG. 7.

At operation 120, a leakage constraint is assigned to the first schematic net. Assigning the leakage constraint includes setting an attribute of the first schematic net in the netlist or otherwise modifying the netlist or an associated file to indicate the leakage constraint associated with the first schematic net. In various embodiments, setting the attribute of the first schematic net in the netlist includes modifying the netlist by setting a new attribute or modifying an existing attribute.

In various embodiments, assigning the leakage constraint includes receiving an assignment indication from a user or automatically determining to assign the leakage constraint based on information associated with the netlist. In some embodiments, determining to assign the leakage constraint is based on the first schematic net being included in or including a specific circuit type. In various embodiments, the specific circuit type includes one of a current mirror, a charge pump, or an analog-to-digital converter.

In various embodiments, assigning the leakage constraint includes assigning a prohibition against proximity to dummy poly gate regions to the first schematic net or assigning a maximum leakage value to the first schematic net.

In various embodiments, assigning the prohibition includes assigning the prohibition against all dummy gate regions, a specific dummy gate region type, dummy gate regions in a specific active region or type of active region, dummy gate regions adjacent to or within a specified distance of the first schematic net, or based on similar criteria.

In various embodiments, assigning the maximum leakage value includes assigning the maximum leakage value based on a circuit type, e.g., a current mirror, a charge pump, or an analog-to-digital converter, a schematic net type, e.g., a branch within a current mirror or charge pump, or one or more specifications corresponding to the netlist.

In some embodiments, assigning the maximum leakage value includes assigning the maximum leakage value based on a leakage test, e.g., the leakage test discussed above with respect to operation 110, performed on the first schematic net. In some embodiments, assigning the maximum leakage value includes assigning the maximum leakage value based on the difference between the circuit performance parameter values corresponding to the first schematic net.

In some embodiments, the first schematic net is one schematic net of a plurality of schematic nets, and assigning the leakage constraint includes assigning a plurality of leakage constraints to the plurality of schematic nets.

In some embodiments, the leakage constraints are assigned in accordance with a set of instructions, e.g., an application program, executed by processor 702 of IC device design system 700, discussed below with respect to FIG. 7.

At operation 130, in some embodiments, the modified netlist is stored in a storage device. In various embodiments, storing the modified netlist in the storage device includes storing the modified netlist in a non-volatile, computer-readable memory or a cell library, e.g., a database, and/or includes storing the modified netlist over a network. In some embodiments, storing the modified netlist in the storage device includes using IC device design system 700, discussed below with respect to FIG. 7.

At operation 140, in some embodiments, a violation of the leakage constraint is determined based on a dummy gate region of an IC layout diagram corresponding to the netlist. Determining the violation includes the dummy gate region intersecting an active region that includes a location of some or all of a component of the first schematic net. In some embodiments, determining the violation includes the dummy gate region intersecting the active region adjacent to the component location.

Determining the violation of the leakage constraint includes comparing the leakage constraint assigned to the first schematic net to an aspect of the dummy gate region, and either concluding that the leakage constraint is violated or concluding that the leakage constraint is met by the aspect of the dummy gate region. In various embodiments, comparing the leakage constraint to the aspect of the dummy gate region includes comparing the maximum leakage current to the aspect of the dummy gate region or comparing the prohibition against proximity to dummy poly gate regions to the aspect of the dummy gate region.

In some embodiments, concluding that the leakage constraint is violated includes determining that a leakage current of the dummy gate region exceeds the maximum leakage current value based on the dummy gate region and component locations, and concluding that the leakage constraint is met includes determining that the leakage current of the dummy gate region does not exceed the maximum leakage current value based on the dummy gate region and component locations.

In some embodiments, concluding that the leakage constraint is violated includes determining that layout data of the dummy gate region conflict with the prohibition against proximity to dummy poly gate regions based on the dummy gate region and component locations, and concluding that the leakage constraint is met includes determining that the layout data of the dummy gate region do not conflict with the prohibition against proximity to dummy poly gate regions based on the dummy gate region and component locations. In various embodiments, the layout data include the location, size, or type of the dummy gate region, one or more leakage values corresponding to the dummy gate region, and/or an identification of the active region or type of active region intersected by the dummy gate region.

In some embodiments, determining the violation of the leakage constraint includes outputting a representation of the IC layout diagram including an indicator corresponding to the leakage constraint violation. In various embodiments, the indicator includes a highlighted, shaded, or bold representation of the dummy gate region and/or one or more schematic net components, one or more leakage current values, and/or other information suitable for indicating the leakage constraint violation.

In some embodiments, determining the violation of the leakage constraint includes comparing at least one leakage constraint of the first schematic net and/or an additional schematic net to at least one aspect of the dummy gate region and/or an additional dummy gate region of the netlist.

In some embodiments, the representation is output in accordance with a set of instructions, e.g., an application program, executed by processor 702 of IC device design system 700, discussed below with respect to FIG. 7.

FIGS. 4A and 4B are diagrams of a non-limiting example of an IC device 400A, in accordance with some embodiments. FIG. 4A is a schematic representation of a netlist including an n-type transistor embodiment of transistors M1 and M2, discussed above with respect to FIG. 2, and FIG. 4B depicts an IC layout diagram 400B of transistors M1 and M2 including an indicator of a leakage constraint violation.

In the embodiment depicted in FIGS. 4A and 4B, transistor M1 includes a source terminal in a schematic net A and a drain terminal in a schematic net B, and transistor M2 includes a drain terminal in a schematic net C and a source terminal in a schematic net D. As depicted in FIG. 4B, IC layout diagram 400B corresponding to IC device 400A includes active region AA1, transistor M1 including gate region G1, transistor M2 including gate regions G2 and G3, and dummy gate regions DG1-DG3, discussed above with respect to FIG. 2. FIG. 4B further depicts schematic nets A-D in accordance with IC layout diagram 400B having been generated from the netlist of IC device 400A represented in FIG. 4A.

In the non-limiting example of FIGS. 4A and 4B, a leakage constraint violation is determined by concluding that either a leakage value included in layout data of dummy gate region DG2 exceeds a maximum leakage value of one or both of schematic nets B or C, or the combined locations of dummy gate region DG2 and one or both of transistors M1 or M2 conflict with a proximity prohibition of the corresponding one or both of schematic nets B or C. In response to determining the leakage constraint violation, IC layout diagram 400B is output including a highlighted representation of dummy gate region DG2 as an indicator of the leakage constraint violation.

In various embodiments, determining the violation of the leakage constraint includes receiving the IC layout diagram, generating the IC layout diagram from the netlist, and/or outputting the leakage violation indicator. In various embodiments, the IC layout diagram is received or generated and/or the indicator is output in accordance with a set of instructions, e.g., an application program, executed by processor 702 of IC device design system 700, discussed below with respect to FIG. 7.

In some embodiments, the first schematic net is one schematic net of a plurality of schematic nets and/or the dummy gate region is one dummy gate region of a plurality of dummy gate regions, and determining the violation of the leakage constraint includes determining one or more additional violations of one or more additional schematic nets of the plurality of schematic nets and/or one or more additional dummy gate regions of the plurality of dummy gate regions.

At operation 150, in some embodiments, the IC layout diagram is modified in response to the leakage constraint violation. Modifying the IC layout diagram includes changing an aspect of the dummy gate region and/or changing one or more locations of one or more schematic net components.

Non-limiting examples of changing the aspect of the dummy gate region include increasing the width of the dummy gate region, removing or replacing the dummy gate region, removing a portion of the active area corresponding to the location of the dummy gate region, and/or adding one or more dummy gate regions or other layout elements adjacent to the dummy gate region.

Non-limiting examples of changing one or more locations of one or more schematic net components include rerouting one or more schematic nets and/or increasing and/or decreasing numbers of gate regions of one or more transistors included in the active region.

FIGS. 5A-5D depict respective IC layout diagrams 500A-500D, in accordance with some embodiments. Each of IC layout diagrams 500A-500D is a modified version of IC layout diagram 400B discussed above with respect to FIGS. 4A and 4B, and illustrates a non-limiting example of a modification made in response to the detection of the leakage constraint violation.

IC layout diagram 500A includes each of the layout elements discussed above with respect to IC layout diagram 400B, and includes dummy gate region DG2 having a width greater than the width of dummy gate DG2 in IC layout diagram 400B. The increased width corresponds to an increased channel length and reduced leakage current between schematic nets B and C compared to IC layout diagram 400B.

IC layout diagram 500B includes each of the layout elements discussed above with respect to IC layout diagram 400B, except that active region AA1 is divided into active regions AA2 and AA3, and also includes a dummy gate region DG4 between dummy gate region DG2 and gate region G2. Active region AA2 extends between dummy gate regions DG1 and DG2, and active region AA3 extends between dummy gate regions DG4 and DG3. By removing a portion of active region AA1, positioning dummy gate region DG2 at an edge of active region AA2, and positioning dummy gate region DG4 at an edge of active region AA3, the leakage path under dummy gate DG2 is removed, thereby reducing leakage current between schematic nets B and C compared to IC layout diagram 400B.

IC layout diagram 500C includes each of the layout elements discussed above with respect to IC layout diagram 400B, and also includes dummy gate regions DG5 and DG6 between dummy gate region DG2 and gate region G2. The addition of dummy gate regions DG5 and DG6 corresponds to an increased aggregate channel length and reduced leakage current between schematic nets B and C compared to IC layout diagram 400B.

IC layout diagram 500D includes each of the layout elements discussed above with respect to IC layout diagram 400B with the exception of dummy gate region DG2. IC layout diagram 500D instead includes gate regions G4 and G5 between gate regions G1 and G2, and a gate region G6 between gate region G3 and dummy gate region DG3. Transistor M1 thereby includes gate regions G1 and G4, and transistor M2 thereby includes gate regions G5, G2, G3, and G6. By including a modified, e.g., an even, number of gates, each of transistors M1 and M2 is configurable such that a source region of transistor M1 is shared with a source region of transistor M2 between gates G4 and G5 at the location previously corresponding to dummy gate region DG2. By including one or more elements (not shown) configured to electrically connect the resultant shared source terminal to a reference voltage source, leakage between schematic nets B and C in IC layout diagram 500D is reduced compared to IC layout diagram 400B.

In some embodiments, modifying the IC layout diagram includes receiving the modified IC layout diagram. In various embodiments, modifying the IC layout diagram includes receiving the modified IC layout diagram or generating the modified IC layout diagram in accordance with a set of instructions, e.g., an application program, executed by processor 702 of IC device design system 700, discussed below with respect to FIG. 7.

At operation 160, in some embodiments, performance of the IC device based on the modified IC layout diagram is verified. Verifying the performance of the IC device includes one or more of performing one or more design rule checks, one or more layout versus schematic checks, one or more simulations, or one or more other operations suitable for confirming that the performance of the IC device based on the modified IC layout diagram conforms to one or more design specifications.

In some embodiments, verifying the performance of the IC device includes performing a post-layout netlist extraction, and obtaining one or more simulation results based on the extracted netlist. In some embodiments, verifying the performance of the IC device includes performing some or all of the operations of method 600, discussed below with respect to FIG. 6.

In some embodiments, verifying the performance of the IC device based on the modified IC layout diagram includes executing some or all of operation 140 using the modified IC layout diagram. In some embodiments, executing some or all of operation 140 using the modified IC layout diagram includes determining whether a second leakage current exceeds the maximum leakage current value, the second leakage current being obtained from the modified IC layout diagram.

At operation 170, in some embodiments, the IC layout diagram is stored in a storage device. In various embodiments, storing the IC layout diagram in the storage device includes storing the IC layout diagram in a non-volatile, computer-readable memory or a cell library, e.g., a database, and/or includes storing the IC layout diagram over a network. In some embodiments, storing the IC layout diagram in the storage device includes using IC device design system 700, discussed below with respect to FIG. 7.

At operation 180, in some embodiments, at least one of one or more semiconductor masks or at least one component in a layer of a semiconductor IC is fabricated, or one or more manufacturing operations are performed based on the modified IC layout diagram. Fabricating one or more semiconductor masks or at least one component in a layer of a semiconductor IC, and performing one or more manufacturing operations, e.g., one or more lithographic exposures, based on the IC layout diagram are discussed below with respect to FIG. 8.

In some embodiments, performing one or more manufacturing operations includes performing one or more IC device design operations. In some embodiments, performing the one or more IC device design operations includes routing one or more metal lines to one or more components of the first schematic net.

By executing some or all of the operations of method 100, a leakage constraint added to at least one schematic net of a netlist is used to determine that a leakage violation is present based on an aspect of a dummy gate region in an IC layout diagram generated from the netlist. By thereby enabling a layout change to be made to address the leakage violation prior to performing a post-layout simulation, one or more debugging steps are avoided compared to approaches in which a leakage constraint is not assigned to a schematic net, and IC device design efficiency is improved.

In various embodiments, design efficiency is further achieved by performing an automated leakage test on a netlist to identify the one or more leakage sensitive schematic nets, and/or by automatically outputting a leakage constraint violation indicator in response to determining that determining that a leakage constraint violation exists in an IC layout diagram.

FIG. 6 is a flowchart of a method 600 of generating a layout diagram of an IC device, in accordance with some embodiments. Method 600 is usable as some or all of operation 160 discussed above with respect to method 100 and FIGS. 1-5D. In some embodiments, method 600 is executed independently of method 100.

In some embodiments, generating the layout diagram of the IC device includes generating a netlist of the IC device. In some embodiments, generating the layout diagram of the IC device includes generating an IC layout diagram corresponding to a plurality of transistors, e.g., planar transistors and/or fin field-effect transistors (FinFETs). Non-limiting examples of IC devices including a plurality of transistors include memory circuits, logic devices, processing devices, signal processing circuits, or the like.

In some embodiments, some or all of method 600 is executed by a processor of a computer. In some embodiments, executing some or all of method 100 is part of executing an automated place-and-route (APR) operation using a processor of a computer. In some embodiments, some or all of method 600 is executed by a processor 702 of an IC device design system 700, discussed below with respect to FIG. 7.

Some or all of the operations of method 600 are capable of being performed as part of a design procedure performed in a design house, e.g., a design house 820 discussed below with respect to FIG. 8.

In some embodiments, the operations of method 600 are performed in the order depicted in FIG. 1. In some embodiments, the operations of method 600 are performed in an order other than the order depicted in FIG. 6. In some embodiments, one or more operations are performed before, between, during, and/or after performing one or more operations of method 600.

At operation 610, a capacitance-only (C-only) netlist extraction is performed on the IC layout diagram. Performing the C-only netlist extraction includes executing a post-layout extraction to generate a netlist based on an IC layout diagram. The IC layout diagram includes a dummy gate region, e.g., a dummy gate region discussed above with respect to method 100 and FIGS. 1-5D. In some embodiments, performing the C-only netlist extraction includes performing the C-only netlist extraction to generate the netlist in a SPICE format.

In some embodiments, performing the C-only netlist extraction includes preventing extraction of one or more resistance values from the IC layout diagram.

In some embodiments, performing the C-only netlist extraction includes storing the extracted netlist in a storage device, e.g., a non-transitory computer-readable storage medium 704 discussed below with respect to FIG. 7.

At operation 620, a first simulation result is obtained based on the extracted netlist including the dummy gate region. Obtaining the first simulation result includes obtaining the first simulation result based on one or more capacitance values extracted from the IC layout diagram and included in the extracted netlist. In some embodiments, obtaining the first simulation result includes obtaining a plurality of first simulation results.

In various embodiments, the first simulation result or plurality of first simulation results includes a voltage or voltage difference, a current or current difference, a power level, a gain, a frequency, a phase shift, a jitter level, an error or error rate, or any parameter suitable for assessing a circuit performance level.

In some embodiments, the dummy gate region is one dummy gate region of a plurality of dummy gate regions, and obtaining the first simulation result includes obtaining the first simulation result based on the extracted netlist including the plurality of dummy gate regions.

At operation 630, the extracted netlist is revised by removing the dummy gate region. In some embodiments, revising the extracted netlist includes executing a script on the extracted netlist. In some embodiments, revising the extracted netlist includes adding one or more comments to the extracted netlist.

In some embodiments, the dummy gate region is one dummy gate region of a plurality of dummy gate regions, and removing the dummy gate region includes removing one or more additional dummy gate regions of the plurality of dummy gate regions.

In some embodiments, revising the extracted netlist includes storing the revised netlist in a storage device, e.g., non-transitory computer-readable storage medium 704 discussed below with respect to FIG. 7.

At operation 640, a second simulation result is obtained based on the revised netlist. Obtaining the second simulation result includes obtaining the second simulation result or a plurality of second simulation results in the manner discussed above for obtaining the first simulation result at operation 620.

At operation 650, a determination is made that a leakage effect does or does not exist by comparing the first simulation result to the second simulation result. Determining whether the leakage effect exists includes determining whether the leakage effect exists based on the dummy gate region or on the plurality of dummy gate regions.

In some embodiments, determining whether the leakage effect exists by comparing the first simulation result to the second simulation result includes comparing some or all of the plurality of first simulation results to some or all of the plurality of second simulation results.

Determining that the leakage effect exists includes concluding that a difference between at least one first simulation result and one second simulation result is greater than or equal to a predetermined limit. Determining that the leakage effect does not exist includes concluding that one or more differences between at least one first simulation result and one second simulation result are within one or more predetermined limits.

In various embodiments, the one or more predetermined limits are based on a specification of some or all of the IC device corresponding to the IC layout diagram and/or netlist from which the IC layout diagram was generated. In various embodiments, the circuit performance parameter and/or predetermined limit are specified by a user or determined automatically based on one or more specifications corresponding to the netlist.

At operation 660, in some embodiments, in response to concluding that the leakage effect exists, the IC layout diagram is modified. In various embodiments, modifying the IC layout diagram includes increasing a width of the dummy gate region or positioning one or more additional dummy gate regions adjacent to the dummy gate region. In some embodiments, modifying the IC layout diagram includes executing some or all of operation 150 discussed above with respect to method 100 and FIGS. 1-5D.

In some embodiments, operation 660 includes returning to operation 610 after modifying the IC layout diagram in response to concluding that the leakage effect exists. In some embodiments, in response to concluding that the leakage effect exists, operation 660 includes storing the IC layout diagram in a storage device in the manner discussed above with respect to operation 170 of method 100.

At operation 670, in some embodiments, in response to concluding that the leakage effect does not exist, the IC layout diagram is stored in a storage device in the manner discussed above with respect to operation 170 of method 100.

In some embodiments, in response to concluding that the leakage effect does not exist, operation 670 includes executing operation 180 discussed above with respect to method 100.

By executing some or all of the operations of method 600, a C-only, post-layout netlist extraction is performed, and simulation results with and without including a dummy gate region in the extracted netlist are compared to determine whether circuit performance is compromised by the dummy gate region in the IC layout diagram. Compared to approaches in which a C-only, post-layout netlist extraction is not performed, e.g., approaches that evaluate circuit performance using simulations based on both capacitance and resistance values, method 600 thereby improves the efficiency of IC device design operations. Because leakage currents corresponding to dummy gate regions are substantially independent of resistance values, simulation accuracy is maintained while improving efficiency.

Figure 7:
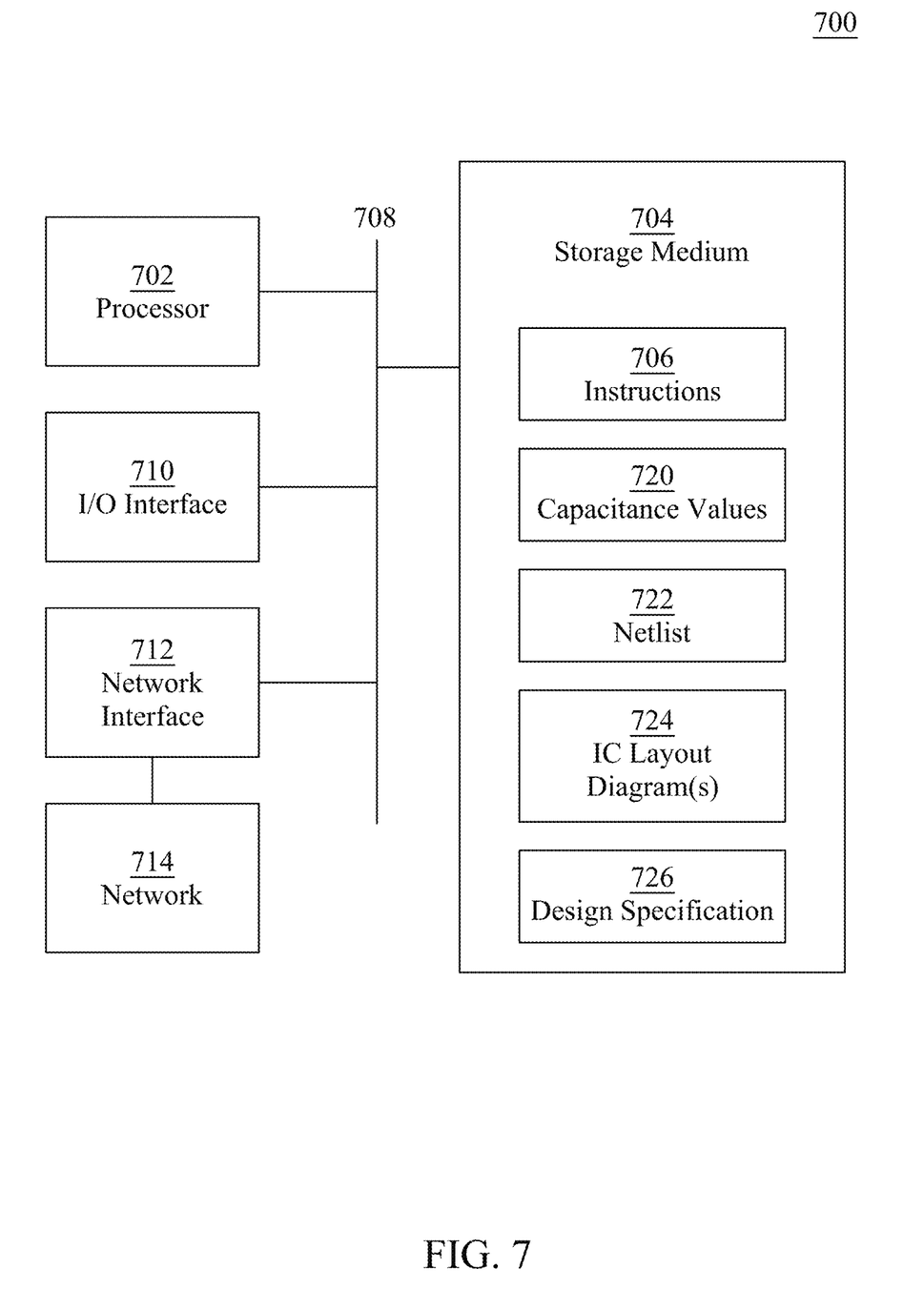
FIG. 7 is a block diagram of an IC device design system, in accordance with some embodiments.

FIG. 7 is a block diagram of IC device design system 700, in accordance with some embodiments. One or more operations of method 100, discussed above with respect to FIGS. 1-5D, and/or method 600, discussed above with respect to FIG. 6, are implementable using IC device design system 700, in accordance with some embodiments. In some embodiments, IC device design system 700 is an EDA system.

In some embodiments, IC device design system 700 is a computing device including a processor 702 and a non-transitory computer-readable storage medium 704. Non-transitory computer-readable storage medium 704, amongst other things, is encoded with, i.e., stores, computer program code 706, i.e., a set of executable instructions. Execution of instructions 706 by processor 702 represents (at least in part) an IC device design system which implements a portion or all of, e.g., a method 100 discussed above with respect to FIG. 1 and/or method 600, discussed above with respect to FIG. 6 (hereinafter, the noted processes and/or methods).

Processor 702 is electrically coupled to non-transitory computer-readable storage medium 704 via a bus 708. Processor 702 is also electrically coupled to an I/O interface 710 by bus 708. A network interface 712 is also electrically connected to processor 702 via bus 708. Network interface 712 is connected to a network 714, so that processor 702 and non-transitory, computer-readable storage medium 704 are capable of connecting to external elements via network 714. Processor 702 is configured to execute computer program code 706 encoded in non-transitory computer-readable storage medium 704 in order to cause IC device design system 700 to be usable for performing a portion or all of the noted processes and/or methods. In one or more embodiments, processor 702 is a central processing unit (CPU), a multi-processor, a distributed processing system, an application specific integrated circuit (ASIC), and/or a suitable processing unit.

In one or more embodiments, non-transitory computer-readable storage medium 704 is an electronic, magnetic, optical, electromagnetic, infrared, and/or a semiconductor system (or apparatus or device). For example, non-transitory computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, non-transitory computer-readable storage medium 704 includes a compact disk-read only memory (CD-ROM), a compact disk-read/write (CD-R/W), and/or a digital video disc (DVD).

In one or more embodiments, non-transitory computer-readable storage medium 704 stores computer program code 706 configured to cause IC device design system 700 to be usable for performing a portion or all of the noted processes and/or methods. In one or more embodiments, non-transitory computer-readable storage medium 704 also stores information which facilitates performing a portion or all of the noted processes and/or methods. In various embodiments, non-transitory computer-readable storage medium 704 stores one or a combination of at least one capacitance value 720, netlist 722, IC layout diagram 724 or at least one design specification 726, discussed above with respect to method 100 and FIGS. 1-5D and/or method 600 discussed above with respect to FIG. 6.

IC device design system 700 includes I/O interface 710. I/O interface 710 is coupled to external circuitry. In various embodiments, I/O interface 710 includes one or a combination of a keyboard, keypad, mouse, trackball, trackpad, display, touchscreen, and/or cursor direction keys for communicating information and commands to and/or from processor 702.

IC device design system 700 also includes network interface 712 coupled to processor 702. Network interface 712 allows system 700 to communicate with network 714, to which one or more other computer systems are connected. Network interface 712 includes wireless network interfaces such as BLUETOOTH, WIFI, WIMAX, GPRS, or WCDMA; or wired network interfaces such as ETHERNET, USB, or IEEE-1364. In one or more embodiments, a portion or all of the noted processes and/or methods, is implemented in two or more systems 700.

IC device design system 700 is configured to receive information through I/O interface 710. The information received through I/O interface 710 includes one or a combination of at least one resistance value, at least one netlist, at least one IC layout diagram, at least one design rule, and/or other parameters for processing by processor 702. The information is transferred to processor 702 via bus 708. IC device design system 700 is configured to transmit and/or receive information related to a user interface through I/O interface 710.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, an IC layout diagram is generated using a tool such as VIRTUOSO® available from CADENCE DESIGN SYSTEMS, Inc., or another suitable layout generating tool.

In some embodiments, the processes are realized as functions of a program stored in a non-transitory computer-readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

By being usable to implement one or more operations of method 100, as discussed above with respect to FIGS. 1-5D and/or method 600, discussed above with respect to FIG. 6, IC device design system 700 including non-transitory computer-readable storage medium 704 enable the benefits discussed above with respect to methods 100 and 600.

Figure 8:
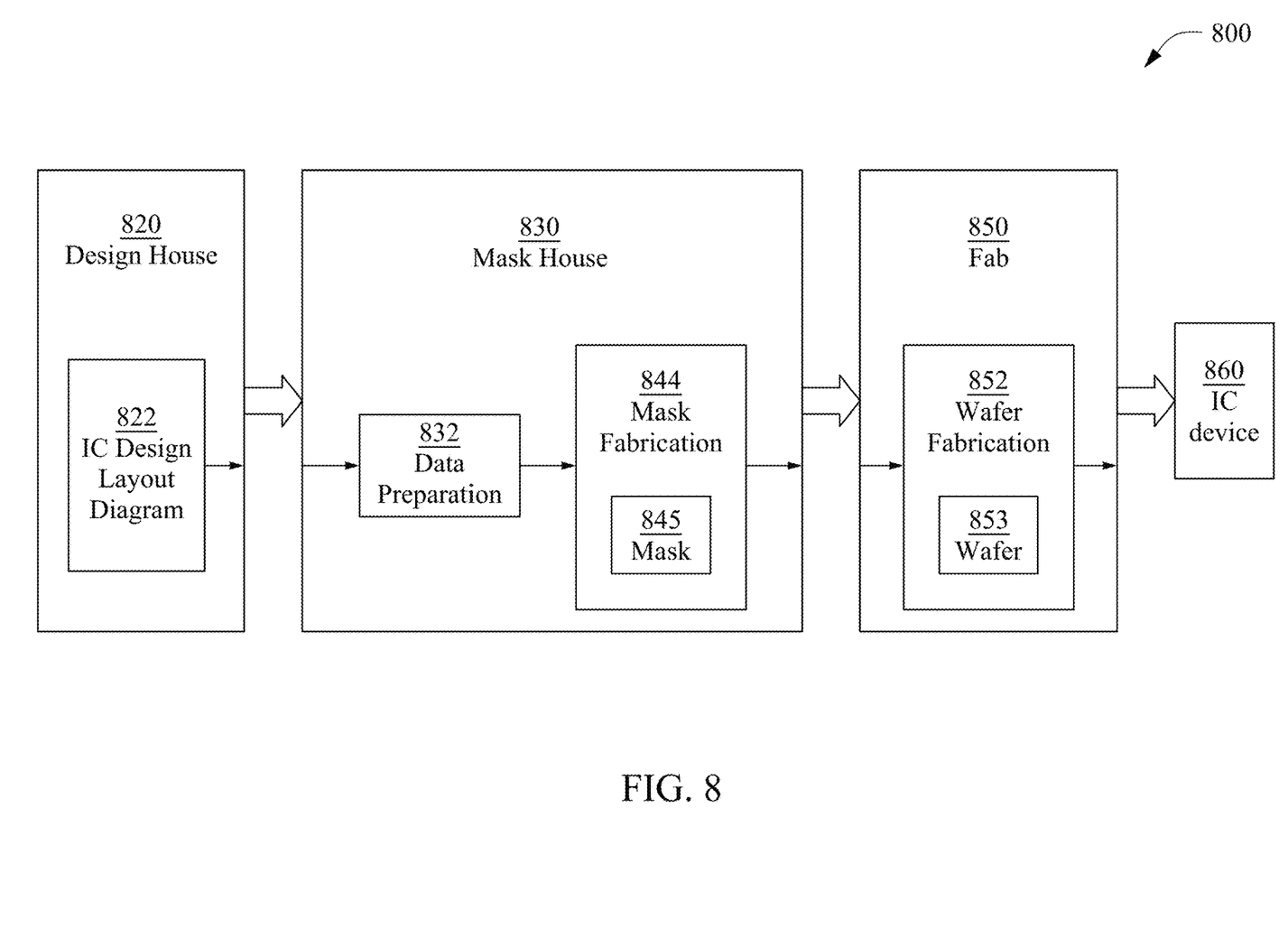
FIG. 8 is a block diagram of an integrated circuit (IC) manufacturing system, and an IC manufacturing flow associated therewith, in accordance with some embodiments.

FIG. 8 is a block diagram of IC manufacturing system 800, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 800.

In FIG. 8, IC manufacturing system 800 includes entities, such as a design house 820, a mask house 830, and an IC manufacturer/fabricator ("fab") 850, that interact with one another in the design, development, and manufacturing cycles and/or services related to manufacturing an IC device 860. The entities in system 800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 850 is owned by a single larger company. In some embodiments, two or more of design house 820, mask house 830, and IC fab 850 coexist in a common facility and use common resources.

Design house (or design team) 820 generates an IC design layout diagram 822 based on method 100, discussed above with respect to FIGS. 1-5D and/or method 600, discussed above with respect to FIG. 6. IC design layout diagram 822 includes various geometrical patterns that correspond to patterns of metal, oxide, or semiconductor layers that make up the various components of IC device 860 to be fabricated. The various layers combine to form various IC features. For example, a portion of IC design layout diagram 822 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 820 implements a proper design procedure including method 100, discussed above with respect to FIGS. 1-5D and/or method 600, discussed above with respect to FIG. 6, to form IC design layout diagram 822. The design procedure includes one or more of logic design, physical design or place and route. IC design layout diagram 822 is presented in one or more data files having information of the geometrical patterns. For example, IC design layout diagram 822 can be expressed in a GDSII file format or DFII file format.

Mask house 830 includes data preparation 832 and mask fabrication 844. Mask house 830 uses IC design layout diagram 822 to manufacture one or more masks 845 to be used for fabricating the various layers of IC device 860 according to IC design layout diagram 822. Mask house 830 performs mask data preparation 832, where IC design layout diagram 822 is translated into a representative data file ("RDF"). Mask data preparation 832 provides the RDF to mask fabrication 844. Mask fabrication 844 includes a mask writer. A mask writer converts the RDF to an image on a substrate, such as a mask (reticle) 845 or a semiconductor wafer 853. The design layout diagram 822 is manipulated by mask data preparation 832 to comply with particular characteristics of the mask writer and/or requirements of IC fab 850. In FIG. 8, mask data preparation 832 and mask fabrication 844 are illustrated as separate elements. In some embodiments, mask data preparation 832 and mask fabrication 844 can be collectively referred to as mask data preparation.

In some embodiments, mask data preparation 832 includes optical proximity correction (OPC) which uses lithography enhancement techniques to compensate for image errors, such as those that can arise from diffraction, interference, other process effects and the like. OPC adjusts IC design layout diagram 822. In some embodiments, mask data preparation 832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 832 includes a mask rule checker (MRC) that checks the IC design layout diagram 822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 822 to compensate for limitations during mask fabrication 844, which may undo part of the modifications performed by OPC in order to meet mask creation rules.

In some embodiments, mask data preparation 832 includes lithography process checking (LPC) that simulates processing that will be implemented by IC fab 850 to fabricate IC device 860. LPC simulates this processing based on IC design layout diagram 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 822.

It should be understood that the above description of mask data preparation 832 has been simplified for the purposes of clarity. In some embodiments, data preparation 832 includes additional features such as a logic operation (LOP) to modify the IC design layout diagram 822 according to manufacturing rules. Additionally, the processes applied to IC design layout diagram 822 during data preparation 832 may be executed in a variety of different orders.

After mask data preparation 832 and during mask fabrication 844, a mask 845 or a group of masks 845 are fabricated based on the modified IC design layout diagram 822. In some embodiments, mask fabrication 844 includes performing one or more lithographic exposures based on IC design layout diagram 822. In some embodiments, an electron-beam (e-beam) or a mechanism of multiple e-beams is used to form a pattern on a mask (photomask or reticle) 845 based on the modified IC design layout diagram 822. Mask 1045 can be formed in various technologies. In some embodiments, mask 845 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 845 includes a transparent substrate (e.g., fused quartz) and an opaque material (e.g., chromium) coated in the opaque regions of the binary mask. In another example, mask 845 is formed using a phase shift technology. In a phase shift mask (PSM) version of mask 845, various features in the pattern formed on the phase shift mask are configured to have proper phase difference to enhance the resolution and imaging quality. In various examples, the phase shift mask can be attenuated PSM or alternating PSM. The mask(s) generated by mask fabrication 844 is used in a variety of processes. For example, such a mask(s) is used in an ion implantation process to form various doped regions in semiconductor wafer 853, in an etching process to form various etching regions in semiconductor wafer 853, and/or in other suitable processes.

IC fab 850 includes wafer fabrication 852. IC fab 850 is an IC fabrication business that includes one or more manufacturing facilities for the fabrication of a variety of different IC products. In some embodiments, IC Fab 850 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 850 uses mask(s) 845 fabricated by mask house 830 to fabricate IC device 860. Thus, IC fab 850 at least indirectly uses IC design layout diagram 822 to fabricate IC device 860. In some embodiments, semiconductor wafer 853 is fabricated by IC fab 850 using mask(s) 845 to form IC device 860. In some embodiments, the IC fabrication includes performing one or more lithographic exposures based at least indirectly on IC design layout diagram 822. Semiconductor wafer 853 includes a silicon substrate or other proper substrate having material layers formed thereon. Semiconductor wafer 853 further includes one or more of various doped regions, dielectric features, multi-level interconnects, and the like (formed at subsequent manufacturing steps).

Details regarding an IC manufacturing system (e.g., system 800 of FIG. 8), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In some embodiments, an integrated circuit (IC) layout diagram generation system includes: a processor; and a non-transitory, computer readable storage medium including computer program code for one or more programs, the non-transitory, computer readable storage medium and the computer program code being configured to, with the processor, cause the processor to generate a layout diagram of an integrated circuit (IC) device by: add a circuit element at a drain terminal of a transistor in a first schematic net of a netlist of an IC device; determine that a circuit performance parameter is affected by the added circuit element; in response to the determination, modify the first schematic net of the netlist to include a net attribute comprising a maximum leakage current value; and store the netlist including the modified first schematic net in the non-transitory, computer readable medium or another non-transistor, computer readable storage medium.

In some embodiments, an IC layout diagram generation system includes: a processor; and a non-transitory, computer readable storage medium including computer code for one or more programs, the non-transitory, computer readable storage medium and the computer program code being configured to, with the processor, cause the processor to generate a layout diagram of an integrated circuit (IC) device by: performing a capacitance-only netlist extraction on an IC layout diagram; obtaining a first simulation result based on the extracted netlist; revising the extracted netlist by removing the dummy gate region; obtaining a second simulation result based on the revised netlist; and compare the first simulation result to the second simulation result to determine a leakage-based design impact.

In some embodiments, an IC layout diagram generation system includes: a processor; and a non-transitory, computer readable storage medium including computer code for one or more programs, the non-transitory, computer readable storage medium and the computer program code being configured to, with the processor, cause the processor to generate a layout diagram of an integrated circuit (IC) device by: assigning, by the IC device design system, a leakage current constraint to a first schematic net of the IC device; determining, by the IC device design system, a violation of the leakage current constraint based on a dummy gate region, wherein the IC layout diagram comprises the dummy gate region between a first component of the first schematic net and a second component of a second schematic net of the IC device; and modifying, by the IC device design system, the IC layout diagram in response to the leakage current constraint violation; and generating, by the IC device design system, a layout file based on the modified IC layout diagram.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit (IC) layout diagram generation system comprising:
   a processor; and
   a non-transitory, computer readable storage medium including computer program code for one or more programs, the non-transitory, computer readable storage medium and the computer program code being configured to, with the processor, cause the processor to generate a layout diagram of an IC device by:
  adding a circuit element at a drain terminal of a transistor in a first schematic net of a netlist of an IC device, wherein the circuit element is configured to emulate a leakage path corresponding to a dummy gate region adjacent to the transistor;
  determining that a circuit performance parameter is affected by the added circuit element;
  in response to the determination, modifying the first schematic net of the netlist to include a net attribute comprising a maximum leakage current value; and
  storing the netlist including the modified first schematic net in the non-transitory, computer readable storage medium or another non-transitory, computer readable storage medium.

2. The IC layout diagram generation system of claim 1, wherein the computer readable storage medium and the computer program code are configured to, with the processor, cause the processor to
  add the circuit element at the drain terminal of the transistor in the first schematic net of the netlist of the IC device by adding one of a current source, a resistor, or an additional transistor at the drain terminal of the transistor in the first schematic net.

3. The IC layout diagram generation system of claim 2, wherein the computer readable storage medium and the computer program code are configured to, with the processor, cause the processor to
  determine that the circuit performance parameter is affected by the added circuit element by evaluating a circuit performance effect in response to the adding the one of the current source, the resistor, or the additional transistor.

4. The IC layout diagram generation system of claim 3, wherein the computer readable storage medium and the computer program code are configured to, with the processor, further cause the processor to
  determine that the circuit performance parameter is affected by the added circuit element by, based on the circuit performance effect, identifying the first schematic net as a leakage sensitive schematic net.

5. The IC layout diagram generation system of claim 1, wherein the computer readable storage medium and the computer program code are configured to, with the processor, cause the processor to
  add the circuit element as a current source or resistor including a first terminal coupled to the drain terminal and a second terminal coupled to a source terminal of the transistor.

6. The IC layout diagram generation system of claim 1, wherein the computer readable storage medium and the computer program code are configured to, with the processor, cause the processor to
  add the circuit element as an additional transistor including a drain terminal coupled to the drain terminal of the transistor, a source terminal coupled to a source terminal of the transistor, and a gate coupled to a power supply node of the IC device.

7. The IC layout diagram generation system of claim 1, wherein the computer readable storage medium and the computer program code are configured to, with the processor, cause the processor to:
  determine that the circuit performance parameter is affected by concluding that a difference between circuit performance parameter values with and without the added circuit element exceeds a predetermined limit; and
  in response to the concluding that the difference exceeds the predetermined limit, assign the maximum leakage current value based on the difference between the circuit performance parameter values.

8. The IC layout diagram generation system of claim 1, wherein the computer readable storage medium and the computer program code are configured to, with the processor, further cause the processor to:
  obtain an IC layout diagram based on the netlist that has been modified, wherein the IC layout diagram comprises the dummy gate region between a first component of the first schematic net and a second component of a second schematic net of the IC device;
  determine that a leakage current of the dummy gate region exceeds the maximum leakage current value; and
  output a representation of the IC layout diagram including an indicator corresponding to the leakage current of the dummy gate region exceeding the maximum leakage current value.

9. The IC layout diagram generation system of claim 8, wherein the computer readable storage medium and the computer program code are configured to, with the processor, further cause the processor to
  determine whether another leakage current exceeds the maximum leakage current value, wherein the another leakage current is obtained from another IC layout diagram different from the IC layout diagram.

10. The IC layout diagram generation system of claim 1, wherein:
  the first schematic net is one schematic net of a plurality of schematic nets of the netlist, and
  the computer readable storage medium and the computer program code are configured to, with the processor, cause the IC layout diagram generation system to:
    add a corresponding circuit element at a corresponding drain terminal of a corresponding transistor in each schematic net of the plurality of schematic nets; and
    for each schematic net of the plurality of schematic nets, determine whether a corresponding circuit performance parameter is affected by the corresponding added circuit element.

11. An integrated circuit (IC) layout diagram generation system comprising:
  a processor; and
  a non-transitory, computer readable storage medium including computer program code for one or more programs, the non-transitory, computer readable storage medium and the computer program code being configured to, with the processor, cause the processor to generate a layout diagram of an IC device by:
    adding a circuit element at a drain terminal of a first transistor in a first schematic net of a netlist of an IC device, the circuit element comprising one of a current source, a resistor, or a second transistor configured to emulate a leakage path corresponding to a dummy gate region adjacent to the first transistor;
    determining that a circuit performance parameter is affected by the added circuit element;
    in response to the determination, modifying the first schematic net of the netlist to include a net attribute comprising a maximum leakage current value; and storing the netlist including the modified first schematic net in the non-transitory, computer readable storage medium or another non-transitory, computer readable storage medium.

12. The IC layout diagram generation system of claim 11, wherein the computer readable storage medium and the computer program code are configured to, with the processor, cause the processor to:
   determine that the circuit performance parameter is affected by concluding that a difference between circuit performance parameter values with and without the added circuit element exceeds a predetermined limit; and
   in response to the concluding that the difference exceeds the predetermined limit, assign the maximum leakage current value based on the difference between the circuit performance parameter values.

13. The IC layout diagram generation system of claim 12, wherein the circuit performance parameter is an error between a source-drain voltage drop of the first transistor and a source-drain voltage drop of a third transistor in a second schematic net of the netlist of the IC device.

14. The IC layout diagram generation system of claim 11, wherein:
   the first transistor is a first transistor of a plurality of transistors in the first schematic net, and
   the computer readable storage medium and the computer program code are configured to, with the processor, cause the IC layout diagram generation system to sequentially add the circuit element to each transistor in the plurality of transistors in the first schematic net.

15. A method of generating an integrated circuit (IC) layout diagram, the method comprising:
   adding a circuit element at a drain terminal of a first transistor in a first schematic net of a netlist of an IC device, wherein the circuit element is configured to emulate a leakage path corresponding to a dummy gate region adjacent to the first transistor;
   determining that a circuit performance parameter is affected by the added circuit element;
   in response to the determination, modifying the first schematic net of the netlist to include a net attribute comprising a maximum leakage current value; and
   storing the netlist including the modified first schematic net in a non-transitory, computer readable storage medium.

16. The method of claim 15, wherein
   the adding the circuit element at the drain terminal of the first transistor in the first schematic net comprises adding one of a current source, a resistor, or a second transistor.

17. The method of claim 15, wherein
   the determining that the circuit performance parameter is affected by the added circuit element comprises concluding that a difference between circuit performance parameter values with and without the added circuit element exceeds a predetermined limit, and
   the modifying the first schematic net of the netlist to include the net attribute comprising the maximum leakage current value comprises assigning the maximum leakage current value based on the difference between the circuit performance parameter values.

18. The method of claim 17, wherein the circuit performance parameter is an error between a source-drain voltage drop of the first transistor and a source-drain voltage drop of a third transistor in a second schematic net of the netlist of the IC device.

19. The method of claim 15, wherein
   the first transistor is a first transistor of a plurality of transistors in the first schematic net, and
   the adding the circuit element at the drain terminal of the first transistor in the first schematic net comprises sequentially adding the circuit element to each transistor in the plurality of transistors in the first schematic net.

20. The method of claim 15, wherein
   the first schematic net is a first schematic net of a plurality of schematic nets of the netlist,
   the adding the circuit element at the drain terminal of the first transistor in the first schematic net comprises adding a corresponding circuit element at a corresponding drain terminal of a corresponding transistor in each schematic net of the plurality of schematic nets, and
   the determining that the circuit performance parameter is affected by the added circuit element comprises, for each schematic net of the plurality of schematic nets, determining whether a corresponding circuit performance parameter is affected by the corresponding added circuit element.

* * * * *